UNITED STATES PATENT OFFICE.

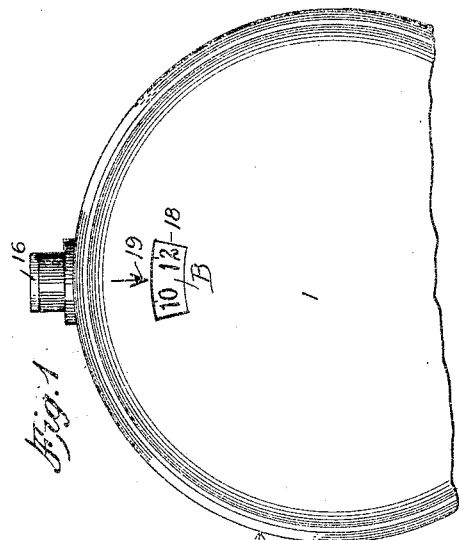
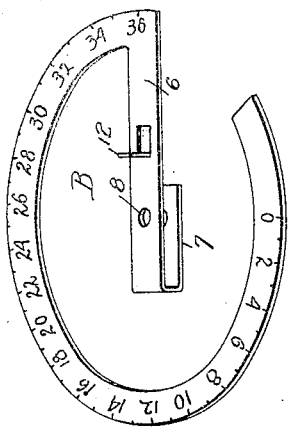
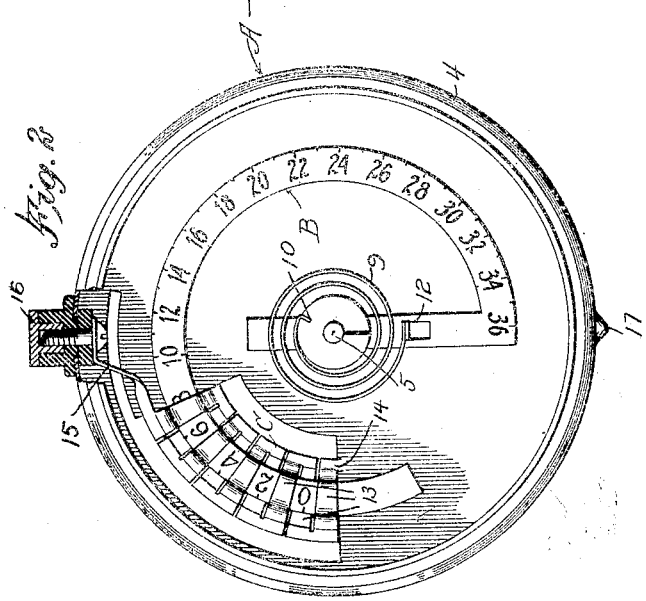
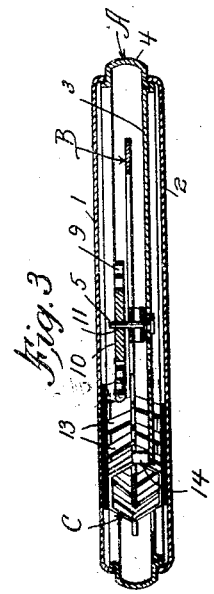

MORRIS BERNARD KASSEL AND ALBERT FINKENBERG, OF NEW YORK, N. Y.

PORTABLE ELECTRICAL MEASURING INSTRUMEN.

1,184,536.   Specification of Letters Patent.   Patented May 23, 1916.

Application filed April 4, 1913. Serial No. 758,801.

*To all whom it may concern:*

Be it known that we, MORRIS B. KASSEL and ALBERT FINKENBERG, citizens of the United States, and residents of the city of New York, borough of Manhattan, in the county and State of New York, have invented a new and Improved Portable Electrical Measuring Instrument, of which the following is a full, clear, and exact description.

This invention relates to electrical measuring instruments of the portable or pocket type, although it possesses features not limited to instruments of this character.

The invention has for one of its objects to improve and simplify the construction and operation of apparatus of this character so as to be comparatively simple and inexpensive to manufacture, reliable and efficient in use and of durable and substantial design.

A specific object of the invention is the provision of a novel ammeter coil which, when traversed by current, creates a magnetic field, the strength of which is indicated by a scale-carrying armature, whereby the strength of the current can be ascertained by a direct reading from the scale. This current coil is formed by striking out from a sheet metal plate or body of the instrument a zigzag strip, alternate bars of which are bowed in opposite directions, so as to form a solenoid coil for receiving a core or armature, one end of the coil being grounded on the plate and the other end connected with one terminal of the instrument.

A further object of the invention is to provide a novel form of armature which carries a scale that is exposed through an opening or window in the casing to enable the amperage of the current passing through the instrument to be ascertained.

With these objects in view, and others as will appear as the description proceeds, the invention comprises various novel features of construction and arrangement of parts which will be more fully described hereinafter and set forth with particularity in the claims appended hereto.

In the accompanying drawings, which illustrate one embodiment of the invention, and wherein similar reference characters are employed to designate corresponding parts throughout the several views, Figure 1 is a plan view of the pocket measuring instrument; Fig. 2 is a view similar to Fig. 1, with the front cover removed, and parts being shown in section. Fig. 3 is a central, transverse section parallel with the axis of the armature; and Fig. 4 is a perspective view of the combined armature and scale.

Referring to the drawing, A designates the body of the instrument and 1 and 2 the front and back covers, respectively, the body and covers forming a casing similar to and about the size of a watch, so that the instrument can be conveniently carried in the pocket, although the instrument may be embodied in other forms.

The body A is shown as consisting of a plate 3, preferably, although not necessarily, integral with the annular portion 4. Mounted centrally on the plate 3 is a fixed shaft or arbor 5, on which is pivoted a combined armature and scale B. This combined armature and scale is approximately three-quarters of a circle and is concentric with the pivot 5, there being on one end a radially-extending arm 6, which extends inwardly beyond the pivot 5 and is doubled back on itself into a member 7, parallel with the arm 6, and both the arm and member are formed with openings 8 for receiving the pivot 5. The combined armature and scale B is held in zero position by a spiral spring 9, which is anchored at one end on a split disk 10 which has an opening 11 to receive the tip of the pivot or post 5, the disk being held by friction on the post. The outer end of the spring is soldered or otherwise secured to a lug 12 stamped out from the arm 6.

The coil C of the instrument is pressed or punched bodily out of the plate 3, and in general outline, as shown in Fig. 2, the coil is arcuate and consists of a zigzag strip of metal forming bars 13 that are alternately bowed in opposite directions to form a longitudinal core or armature passage into which the free end of the combined armature and scale extends. The end 14 of the coil C is left connected with the plate 3, so as to be grounded on the body of the instrument, and the opposite end of the coil is connected by a wire or equivalent means 15, with a terminal 16. The terminal 17 of the body of the instrument is in the form of a projection pressed outwardly from the annular portion of the body of the instrument, but any other form of terminal may be employed. The top plate or cover 1 is provided with an opening 18 which is so positioned as to expose a portion of the combined armature and dial therethrough, and at the opening is an index mark 19, which coöperates with the scale figures to enable the strength of the current passing through the instrument to be ascertained.

In order to steady the coil at a point intermediate its ends the convolutions of the coil, so to speak, are in contact with the front and back covers or plates 1 and 2, and in order to prevent the convolutions from being grounded they are coated with suitable insulation. In order to contact with the back cover 2, one side of the coil passes through the opening left in the plate 3 by punching out the metal from which the coil is formed.

In practice, when it is desired to measure the strength of current passing through a circuit, the terminals 16 and 17 of the instrument are connected with such circuit so that current will flow through the coil C by way of the terminal 16, wire 15, coil C, plate 3 and terminal 17. A magnetic flux will be set up through the coil, which attracts the armature B, that is preferably of iron or other magnetic material. According to the strength of this magnetic flux the armature and scale will be moved a definite distance into the coil C against the tension of the spring 9. The relation of the scale to the index 19 will indicate the number of amperes passing through the instrument. As soon as the instrument is removed from the circuit the spring 9 will retract the armature and scale to its zero position.

While the instrument has been described as an ammeter, it is to be understood that the principle of the invention is capable of adaptation to volt meters, combination meters or other instruments.

From the foregoing description taken in connection with the accompanying drawings, the advantages of the method of operation and of the device shown will be readily understood by those skilled in the art to which the invention appertains, and while we have described the device which we now consider to be the best embodiment thereof, we desire to have it understood that the apparatus shown is merely illustrative, and that such changes may be made when desired as are within the scope of the appended claims.

Having thus described our invention, we claim as new and desire to secure by Letters Patent:

1. An electrical measuring instrument comprising a sheet metal body having a coil stamped therefrom in the form of a zigzag strip, alternating bars of which are oppositely bowed by the longitudinal passage, and an indicating element including an armature or core adapted to be drawn into the coil by the passage of current through the latter.

2. An instrument comprising a body having a zigzag strip integrally connected therewith and formed to comprise a coil, and an indicating device including an armature in the form of a core extending into the coil and means for opposing the movement of the armature into the coil.

3. An instrument of the class described comprising a body consisting of a plate and a peripheral portion, covers applied to the peripheral portion to form a casing, a coil struck out from said plate, an armature mounted in the casing in coöperative relation with the coil, and means for opposing the movement of the armature.

4. An instrument of the class described comprising a body having an opening, a post thereon, an armature pivoted on the post and including a circular portion carrying a scale, a coil into which the scale is attracted, and means for opposing the movement of the armature, the scale of the armature being exposed through the opening in the body.

5. An instrument of the class described comprising a casing, a plate in the casing, a coil struck from the plate with one end integrally connected therewith, the convolutions of the coil being insulated from and engaged by the front and back of the casing, and an indicating device in the casing including an armature mounted in coöperative relation with the coil.

6. In an instrument of the class described, a combined armature and scale consisting a circular portion, and a radial arm passing toward and beyond the center of the circular portion and bent backwardly under said arm to provide a two-point contact with a supporting pivot.

7. In an instrument of the class described, the combination of a plate having a zigzag arcuate strip struck out therefrom, with one end of the strip integral with the plate, and alternate portions of the zigzag strip being bent to coöperate with the remaining portions to form a coil, an armature mounted on the plate and having a portion extending into the coil, means for opposing the movement of the armature, and means for connecting the coil in circuit.

8. A magnet coil consisting of a piece of sheet metal slit to form a zigzag element, the portions between the slits being bent alternately in opposite directions to form a coil, each convolution of which consists of two oppositely bent portions.

9. A magnet consisting of a piece of flat sheet metal having slits extending alternately inwardly from opposite edges, and the slits overlapping, the portions between the slits being bent alternately in opposite directions to form coil convolutions.

In testimony whereof we have signed our names to this specification in the presence of two subscribing witnesses.

MORRIS BERNARD KASSEL.
ALBERT FINKENBERG.

Witnesses:
Louis J. Schwartz,
Abraham J. Grotker.